(12) United States Patent
Sip et al.

(10) Patent No.: US 8,203,844 B2
(45) Date of Patent: Jun. 19, 2012

(54) ELECTRONIC DEVICE WITH BACK-UP POWER SUPPLY

(75) Inventors: Kim-Yeung Sip, Shenzhen (CN); Song-Ling Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 233 days.

(21) Appl. No.: 12/723,689

(22) Filed: Mar. 15, 2010

(65) Prior Publication Data

US 2011/0141708 A1 Jun. 16, 2011

(30) Foreign Application Priority Data

Dec. 14, 2009 (CN) .......................... 2009 1 0311408

(51) Int. Cl.
*H05K 5/00* (2006.01)
(52) U.S. Cl. .................. 361/755; 361/715; 361/728
(58) Field of Classification Search .................. 361/715, 361/755, 728, 730, 752, 800; 455/575.1–575.4; 340/636.1; 320/136
See application file for complete search history.

(56) References Cited

U.S. PATENT DOCUMENTS

| | | | | |
|---|---|---|---|---|
| 5,583,744 A * | 12/1996 | Oguchi et al. | ........... | 361/679.58 |
| 6,002,583 A * | 12/1999 | Shoji et al. | ................ | 361/679.55 |
| 6,191,941 B1 * | 2/2001 | Ito et al. | .................... | 361/679.27 |
| 6,385,041 B1 * | 5/2002 | Choi | ......................... | 361/679.41 |
| 6,768,637 B1 * | 7/2004 | Amemiya | ................ | 361/679.55 |
| 7,433,182 B2 * | 10/2008 | Fan | .......................... | 361/679.55 |
| 7,751,860 B2 * | 7/2010 | Symons et al. | ............ | 455/575.3 |
| 2012/0008263 A1 * | 1/2012 | Sugita | ...................... | 361/679.01 |

* cited by examiner

*Primary Examiner* — Hung S Bui
(74) *Attorney, Agent, or Firm* — Altis Law Group, Inc.

(57) ABSTRACT

The disclosure provides an electronic device having back-up power during battery replacement. The electronic device includes a body, a printed circuit board (PCB) mounted in the body, and an electrode assembly connected to the PCB. The body defines an accommodating space. The electrode assembly may rotate relative to the body and further comprises at least two groups of contacts aligned in different rotation orientations. The accommodating space is configured to accommodate a first battery. A first group of the at least two groups of contacts is engaged with the first battery, the at least two groups of contacts are connected in parallel to the PCB, when the first battery is being replaced by a second battery, the first group of contacts is kept engaged with the first battery, and a second group of the at least two groups of contacts is engaged with the second battery.

11 Claims, 12 Drawing Sheets

ELECTRONIC DEVICE WITH BACK-UP POWER SUPPLY

BACKGROUND

1. Technical Field

The disclosure relates to electronic devices and, more particularly, to an electronic device having back-up power during battery replacement.

2. Description of the Related Art

Electronic apparatuses, such as mobile phones, run on battery power. When a battery runs low and the user replaces the battery with another one rather than charging it, the mobile phone must be powered off, which may result in data loss.

BRIEF DESCRIPTION OF THE DRAWINGS

The components in the drawings are not necessarily drawn to scale, the emphasis instead being placed upon clearly illustrating the principles of the electronic device. Moreover, in the drawings, like reference numerals designate corresponding parts throughout the several views.

DETAILED DESCRIPTION

Figure 1:
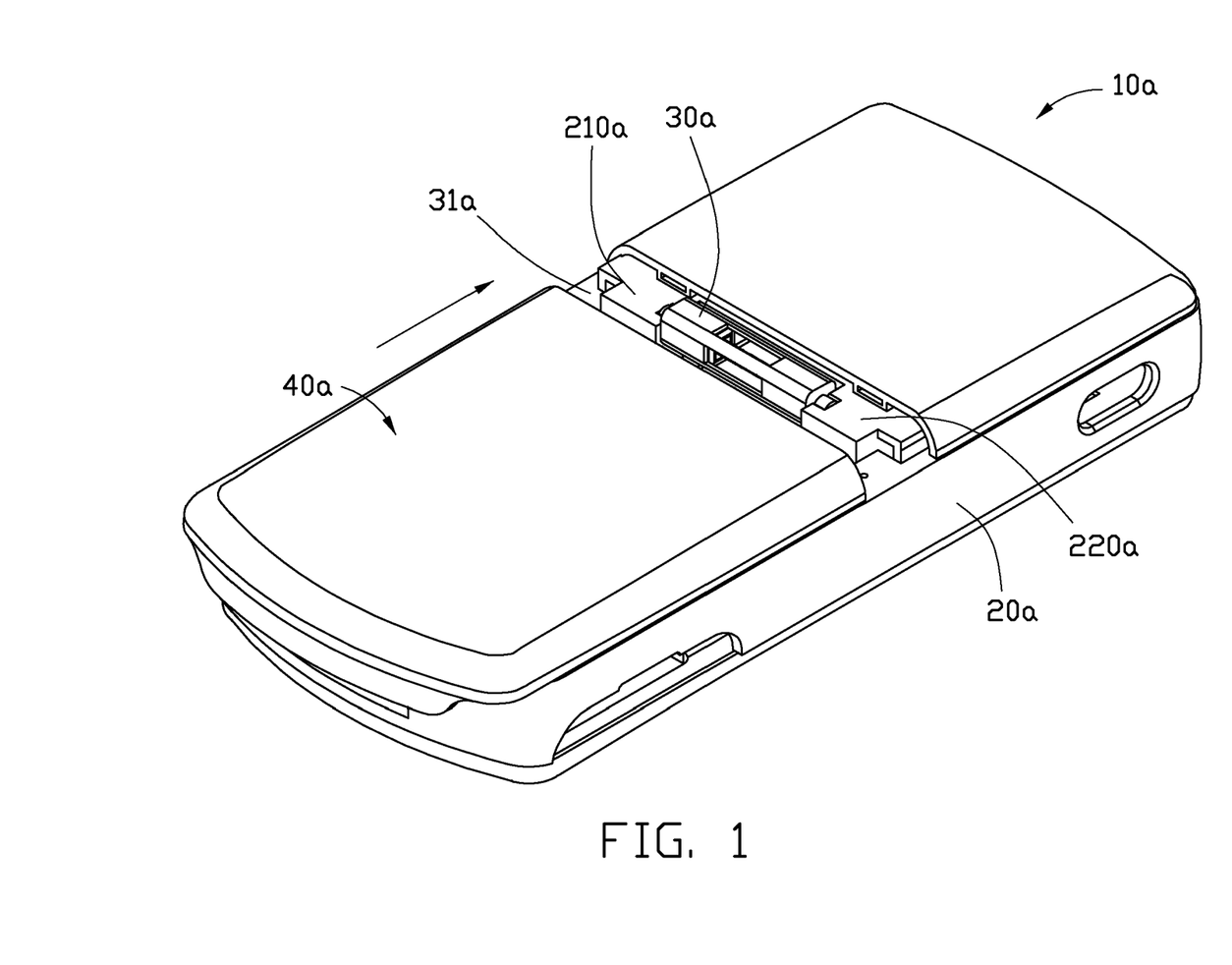
FIG. 1 is a schematic view of an electronic device in accordance with a first embodiment.
Figure 2:
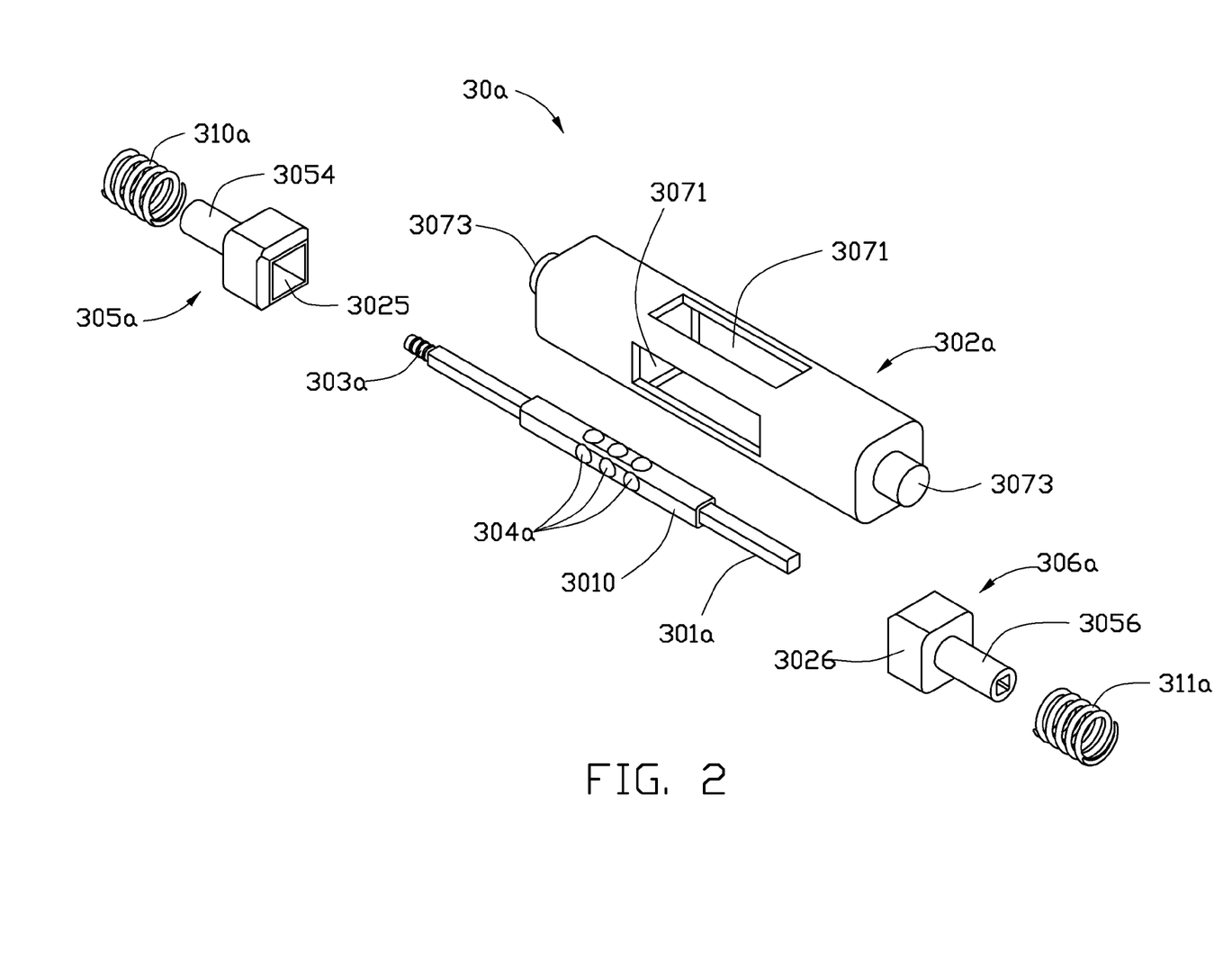
FIG. 2 is an exploded, perspective view of an electrode assembly of the device shown in FIG. 1.
Figure 3:
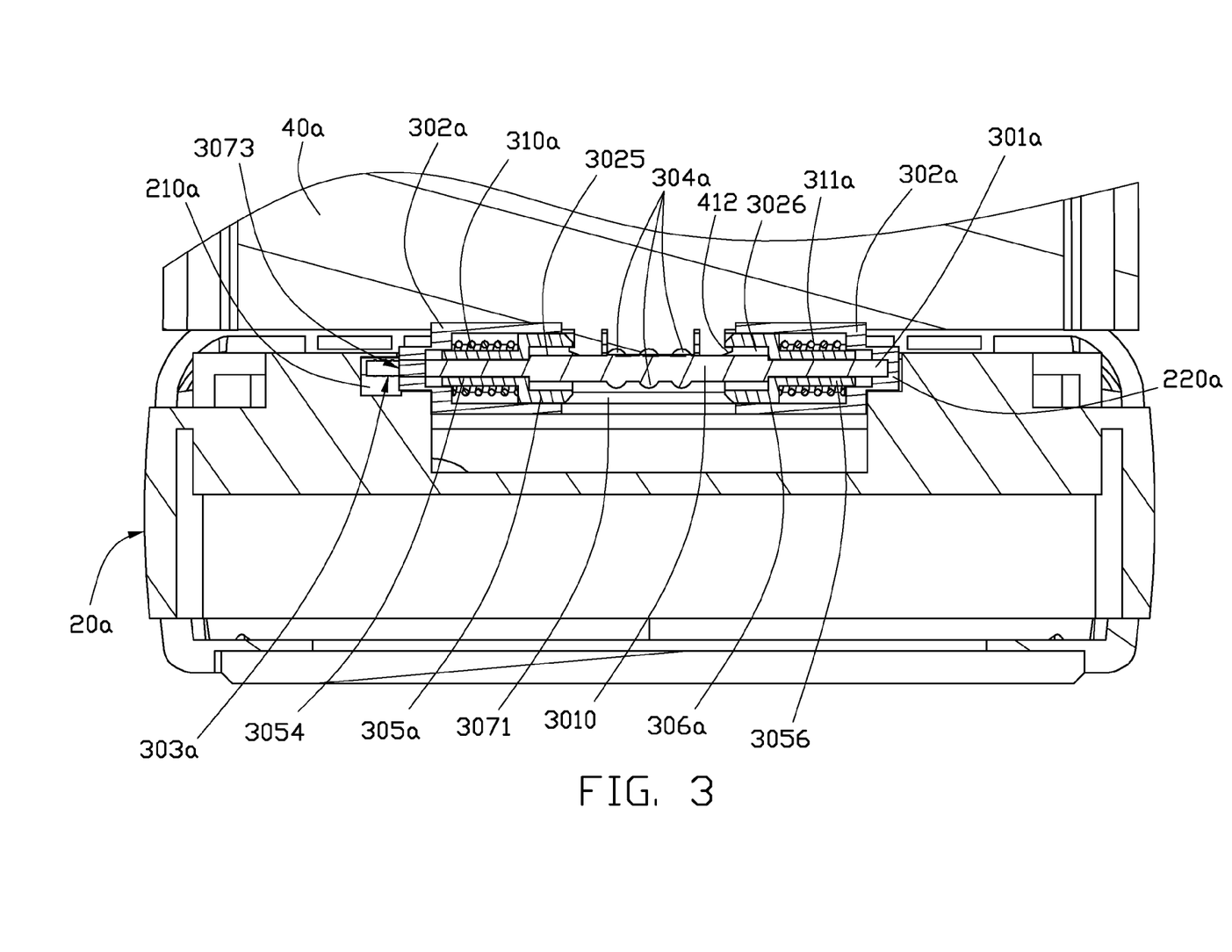
FIG. 3 is a sectional view enlarging a portion of a battery connected to the electrode assembly of FIG. 2 of the device shown in FIG. 1.

FIGS. 1-5 illustrate an electronic device with a back-up power supply for use during battery replacement in accordance with a first exemplary embodiment. Referring to FIGS. 1-3, an electronic device employs a battery as a power source. For illustrative purposes, a mobile phone is used as an example. The mobile phone 10a includes a body 20a, an electrode assembly 30a, two retaining protrusions 210a and 220a, and a printed circuit board (PCB) (not shown) mounted in the body 20a. An accommodating space 31a is also defined by the mobile phone 10a. The electrode assembly 30a is attached to the body 20a. The accommodating space 31a is configured to accommodate a battery 40a. The two retaining protrusions 210a and 220a are fitted on the body 20a and engaged with the electrode assembly 30a. The electrode assembly 30a may rotate relative to the two retaining protrusions 210a and 220a. The battery 40a is connected to the electrode assembly 30a and the electrode assembly 30a is connected to the PCB.

The electrode assembly 30a further includes a rotation element 301a, a cavity member 302a, an electric ring 303a, and two end portions 305a and 306a. Each of two opposite end walls of the cavity member 302a is fitted with a circular protruding portion 3073. The cavity member 302a is configured to accommodate the two end portions 305a and 306a and the rotation element 301a. In this embodiment, the rotation element 301a is an axis. At least two surfaces of the cavity member 302a each define an opening 3071 therein. In this embodiment, the cavity member 302a has four circumferential side surfaces with each defining one opening 3071 therein. The circular protruding portions 3073 of the cavity member 302a are engaged with the two retaining protrusions 210a and 220a.

The axis 301a passes through the cavity member 302a. The electric ring 303a is connected to one end of the axis 301a and engaged with one of the two retaining protrusions 210a and 220a. A connection element 3010 is mounted on the axis 301a and has four circumferential side surfaces. At least two of the side surfaces of the connection element 3010 each have a group of contacts 304a distributed thereon. All groups of contacts 304a are connected parallel to the electric ring 303a and the electric ring 303a is connected to the PCB, thus, the groups of contacts 304a provide the same voltage as the battery for the mobile phone 10a.

One end of the end portion 305a defines a first receiving space 3025 and one end of the end portion 306a defines a second receiving space 3026. A first coil spring 310a covers one end 3054 of the first end portion 305a and a second coil spring 311a covers the other end 3056 of the second end portion 306a. The two ends of the axis 301a are clamped in the two ends 3054 and 3056, respectively. Both the coil springs 310a and 311a respectively cover the two ends 3054 and 3056 and are clamped onto the two circular protruding portions 3073 so that the cavity member 302a is engaged with the two retaining protrusions 210a and 220a.

Referring particularly to FIG. 3, the battery 40a has a group of electric contacts and two hooks 412 on one side of the battery 40a. When the battery 40a is inserted into the accommodating space 31a, the group of electric contacts of the battery 40a is engaged with one group of contacts 304a via one opening 3071 on one side surface of the cavity member 302a. The two hooks 412 are clamped on an inside surface of the cavity member 302a, and thereby, the battery 40a is engaged with the cavity member 302a and supplies power for the mobile phone 10a.

Figure 4:
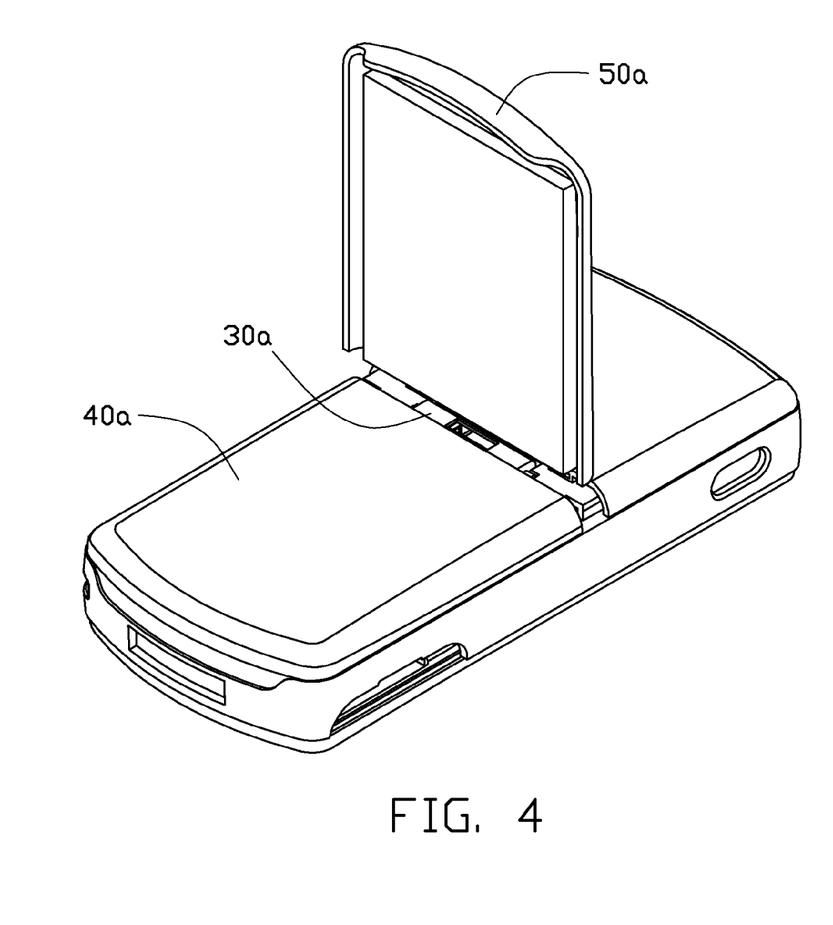
FIG. 4 is similar to FIG. 1 and including a replacement battery.

As shown in FIG. 4, when the battery 40a is to be replaced with another battery 50a, the battery 40a is maintained in the accommodating space 31a. The group of electric contacts of the battery 50a is engaged with the second group of contacts 304a in another opening 3071 on another surface of the cavity member 302a and two hooks of the battery 50a are clamped on the cavity member 302a. At this point the batteries 40a and 50a are connected to the mobile phone 10a in parallel and both supply power.

Figure 5:
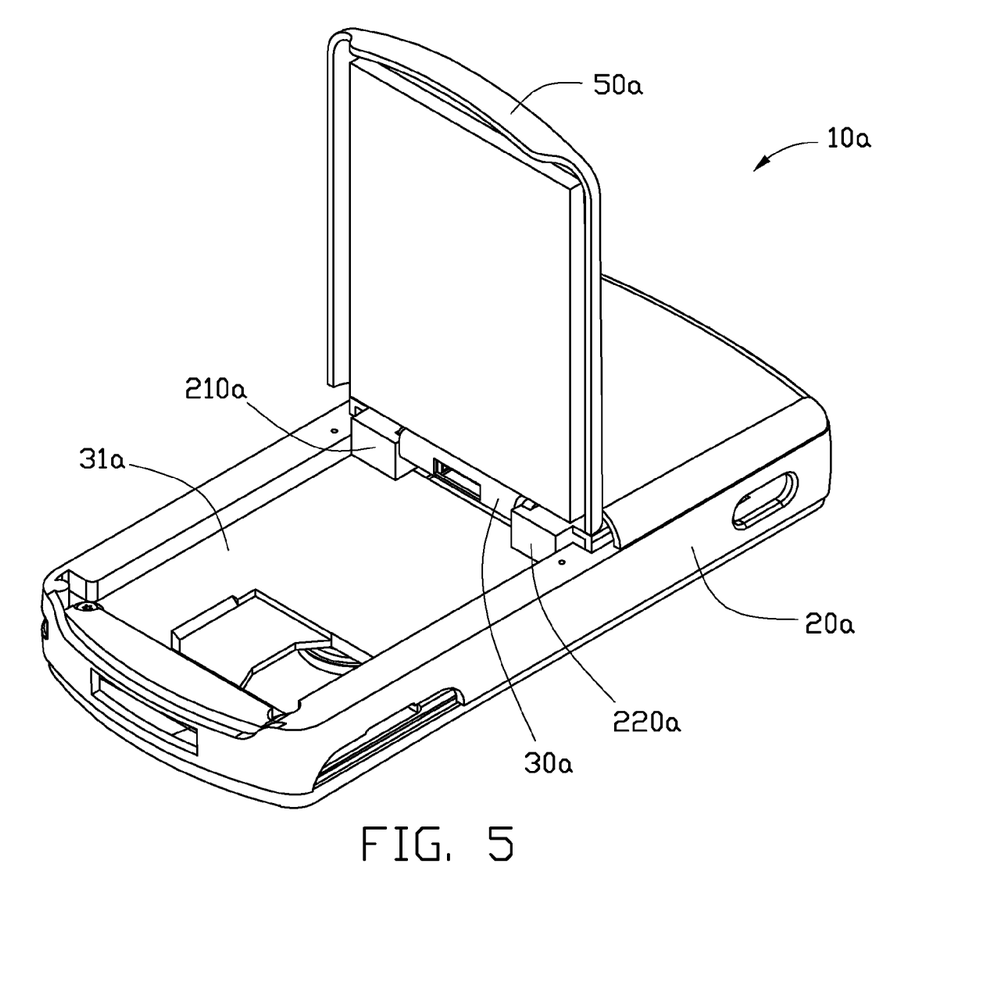
FIG. 5 is similar to FIG. 4 but with the bad battery of FIG. 1 removed.

As shown in FIG. 5, the battery 40a can now be detached and removed from the accommodating space 31a without interrupting the supply of power to the mobile phone 10a, and the battery 50a can then be rotated into the accommodating space 31a and become sole source of power for the mobile phone 10a. Therefore, the mobile phone 10a remains powered on while the battery is being replaced.

Figure 6:
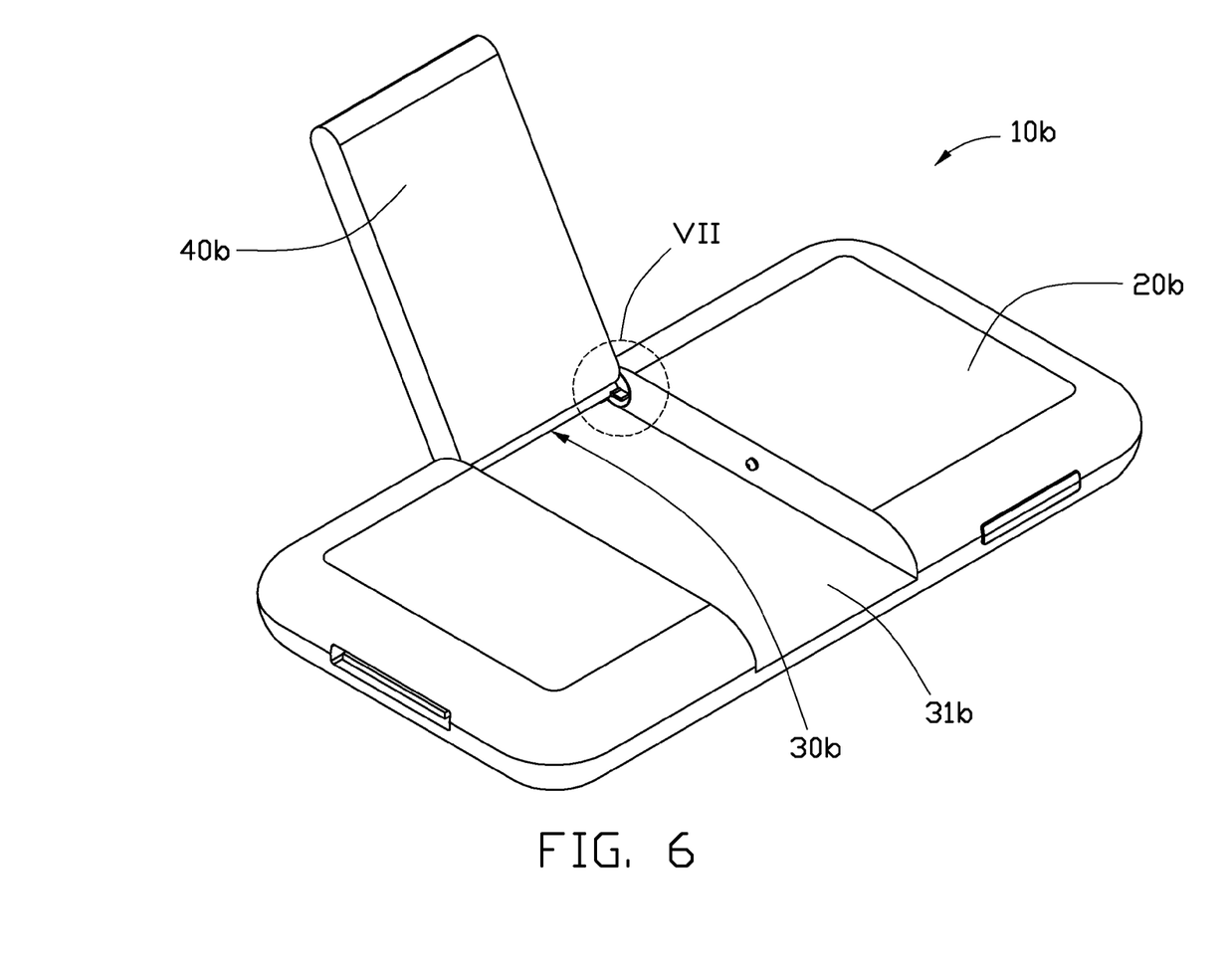
FIG. 6 is a schematic view of an electronic device in accordance with a second embodiment.
Figure 7:
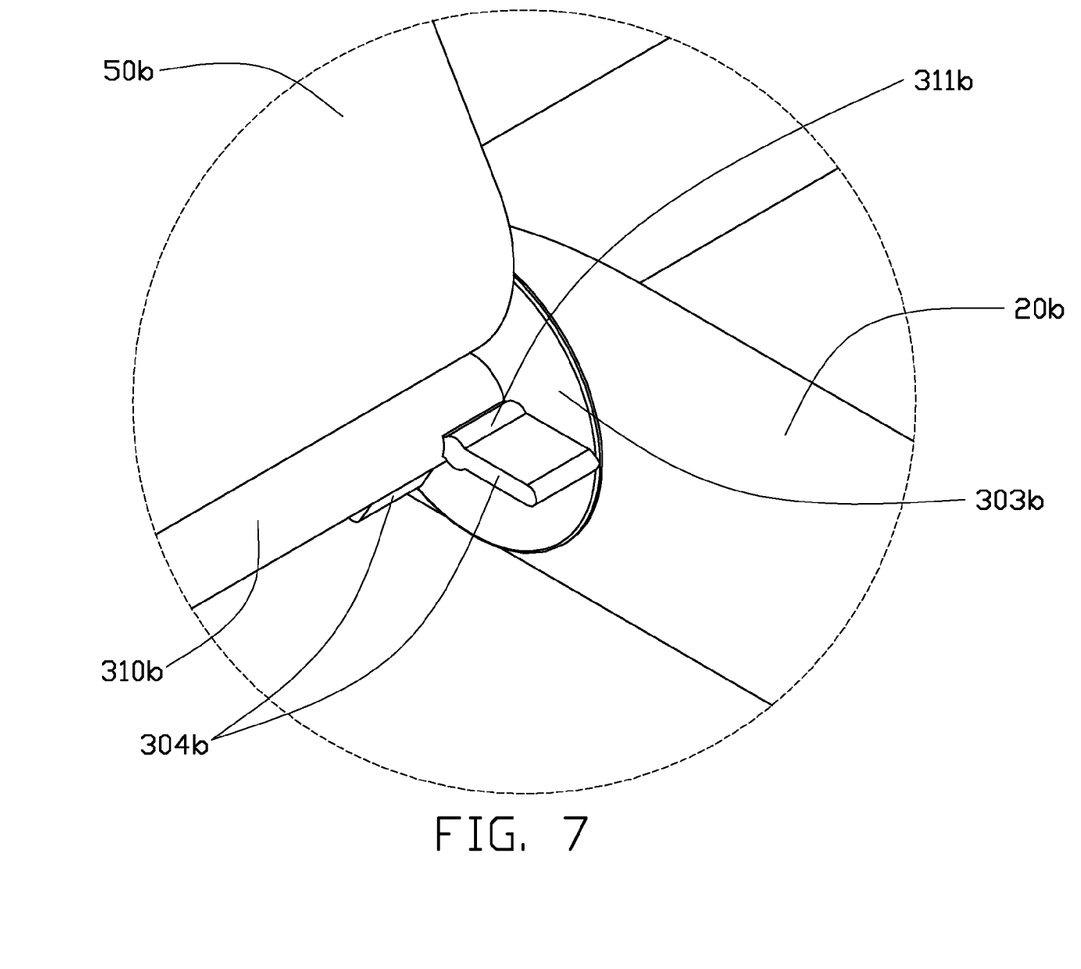
FIG. 7 is an enlarged view of the encircled portion VII of FIG. 6.
Figure 8:
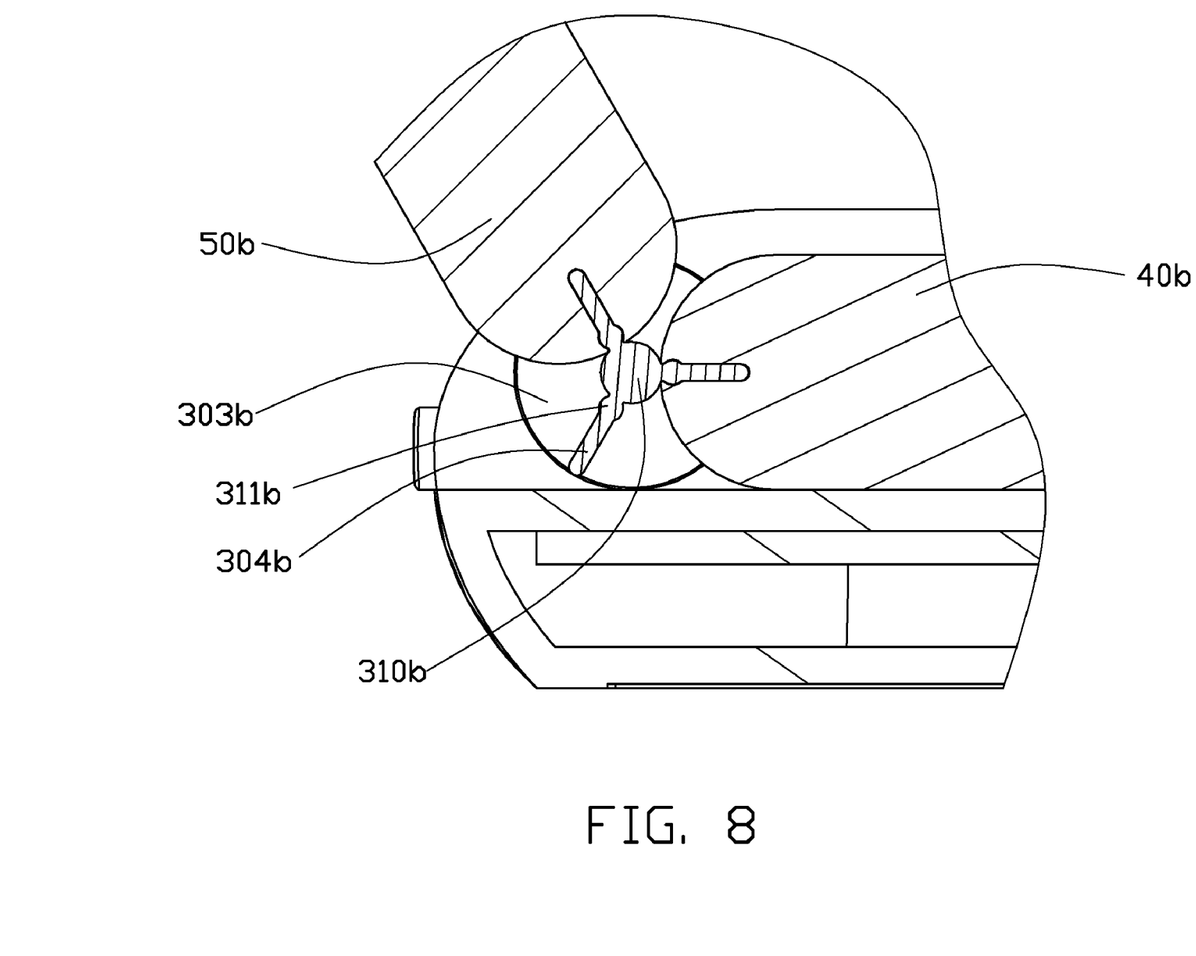
FIG. 8 is a sectional view enlarging a portion of the device of FIG. 6 and including a replacement battery.
Figure 9:
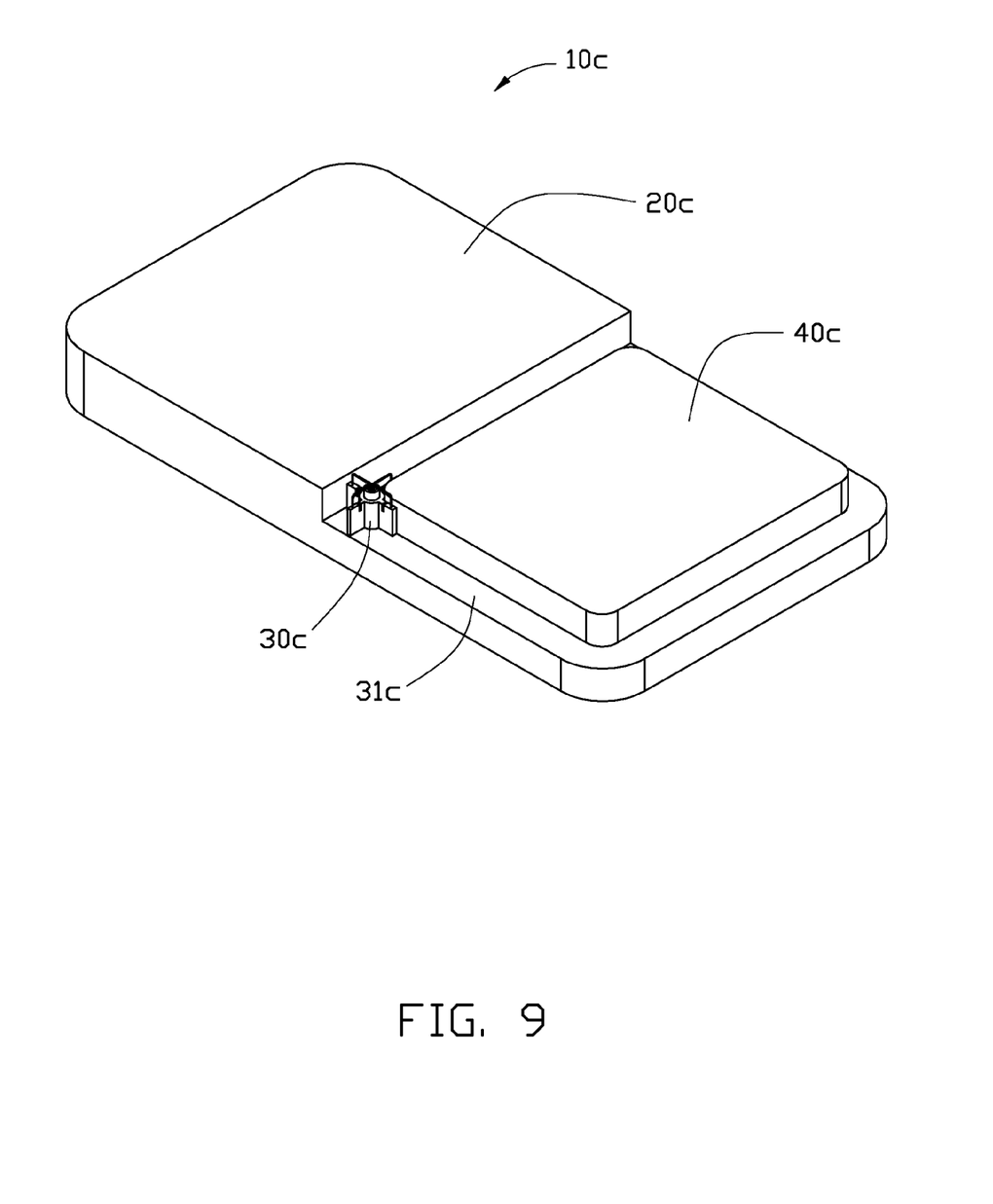
FIG. 9 is a schematic view of an electronic device in accordance with a third embodiment.
Figure 10:
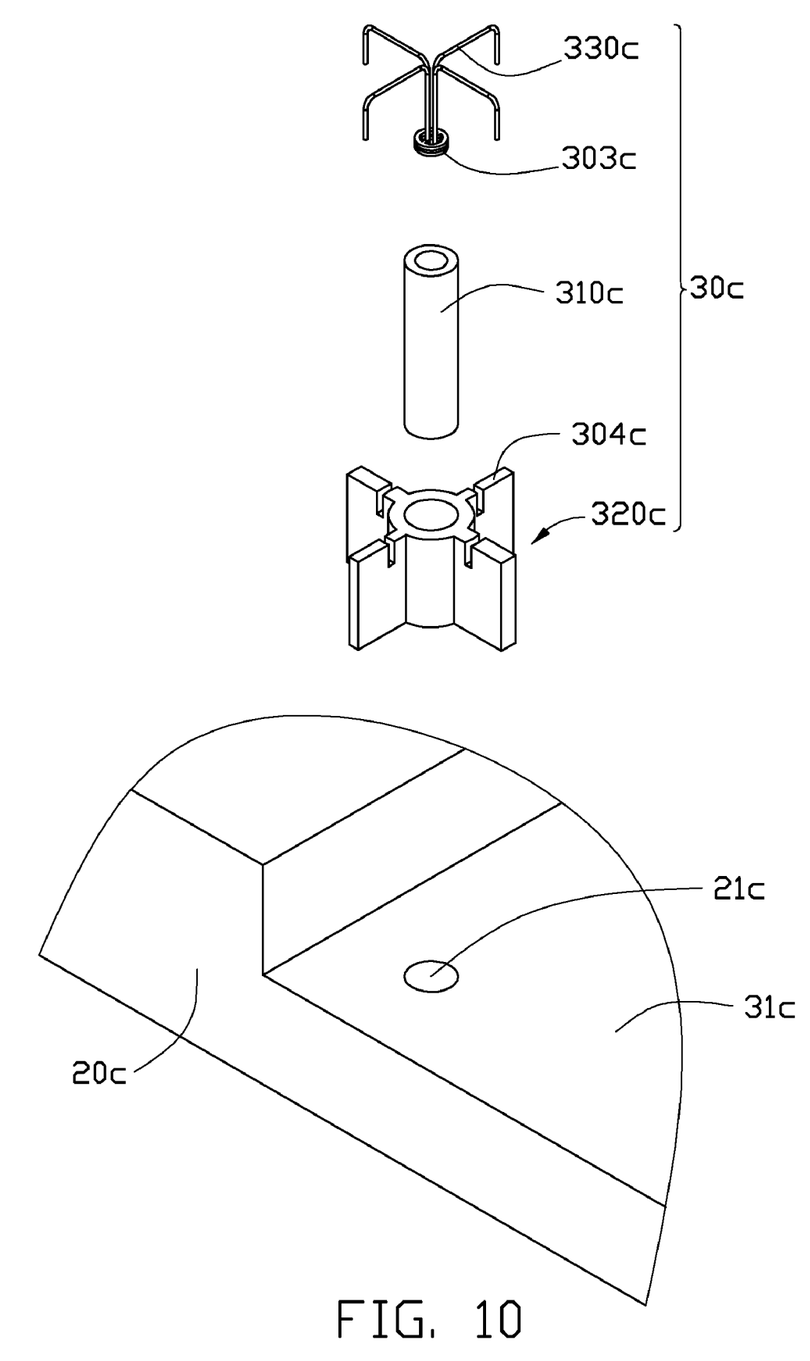
FIG. 10 is an exploded, isometric view of an electrode assembly of the device shown in FIG. 9.
Figure 11:
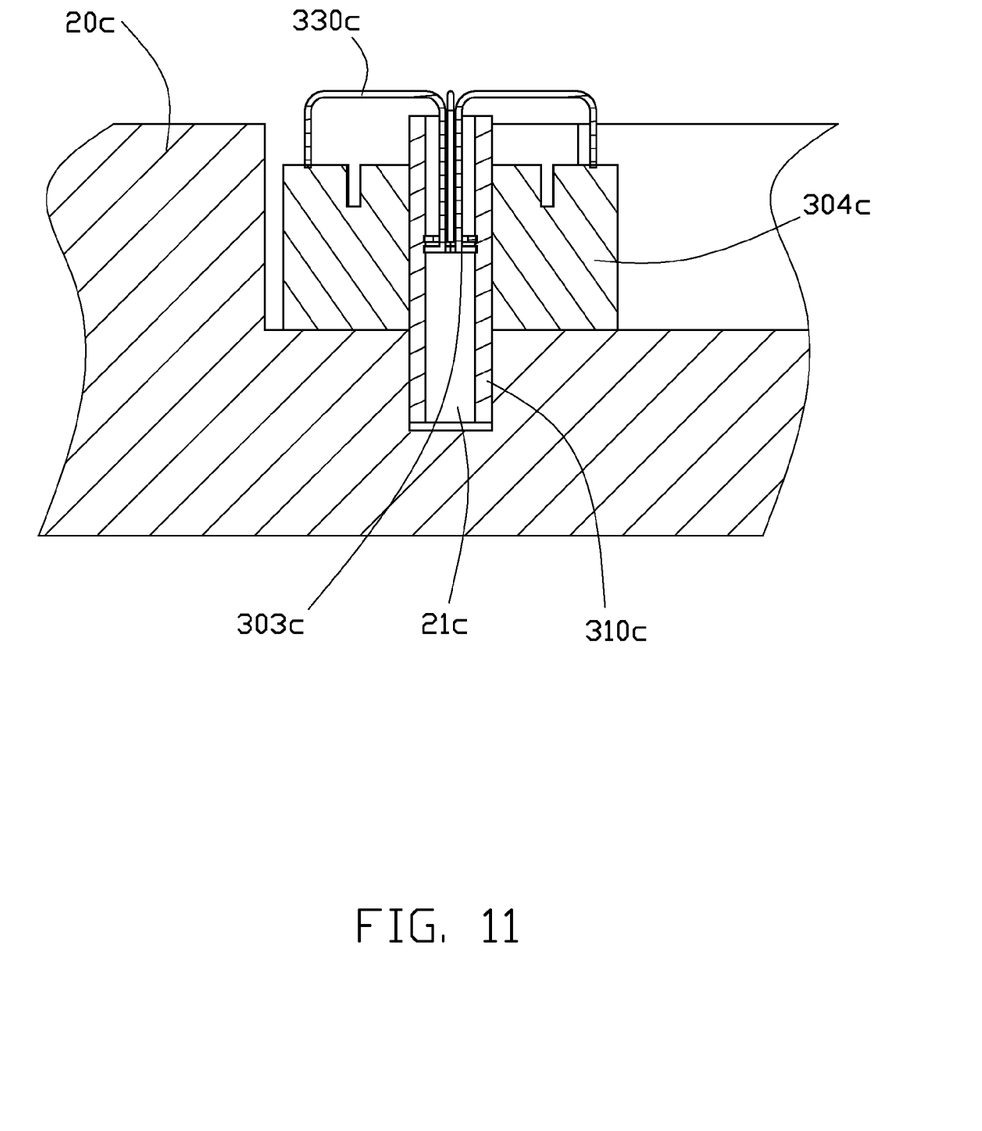
FIG. 11 is a sectional view enlarging a portion of the device shown in FIG. 9.
Figure 12:
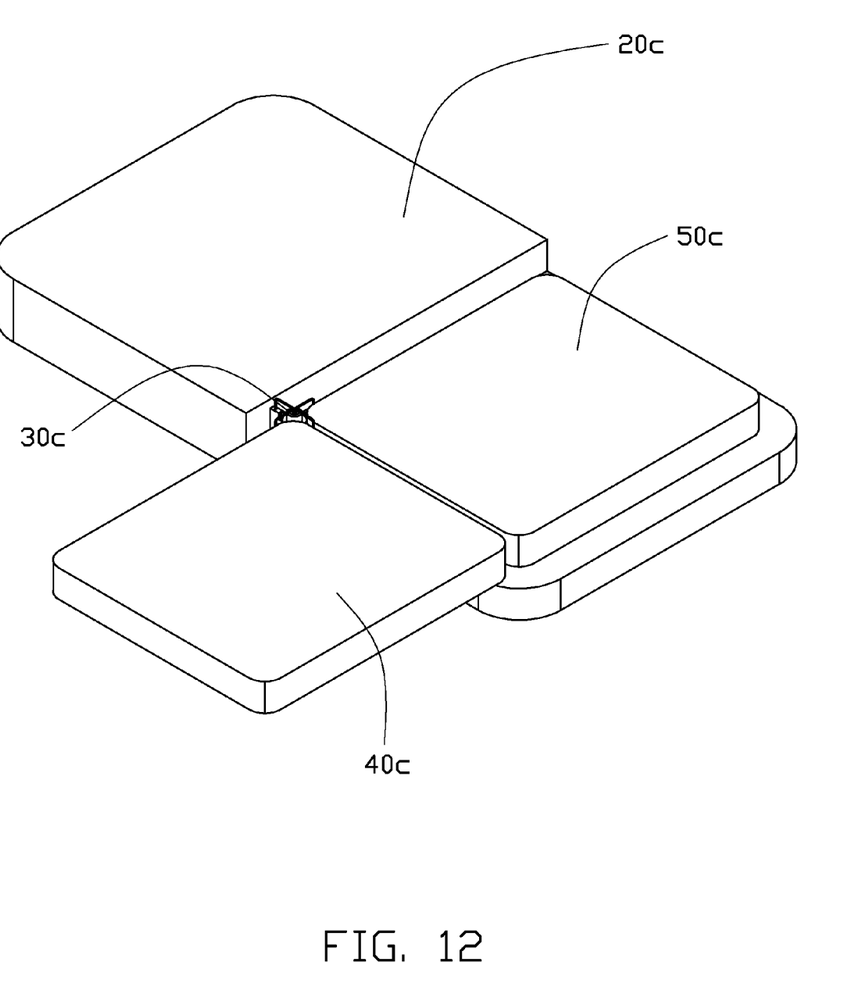
FIG. 12 is similar to FIG. 9, but also including a replacement battery.

FIGS. 6-8 illustrate the electronic device with a back-up power supply during battery replacement in accordance with a second exemplary embodiment. The mobile phone 10b includes a body 20b, an electrode assembly 30b, and a PCB (not shown) mounted in the body 20b. An accommodating space 31b is defined by the body 20b. The accommodating space 31b is configured to accommodate a battery 40b. The electrode assembly 30b further includes a rotation element 310b, an electric ring 303b on one end of the rotation element 310b, and at least two groups of contacts 304b mounted on the same end of the rotation element 310b. In this embodiment, the rotation element 310b is a circular axis. The axis 310b may rotate relative to the electric ring 303b. A protruding part 311b is formed between each group of contacts 304b and the axis 310b. In this embodiment, the number of the groups of contacts 304b is three. All groups of contacts 304b are connected in parallel to the PCB and provide the same voltage for the mobile phone 10b.

The battery 40b has a group of electric contacts and a hollow part. A group of electric contacts is mounted in the hollow part. When the battery 40b is inserted into the accommodating space 31b, the hollow part of the battery 40b is engaged with the protruding part 311b and the group of electric contacts of the battery 40b is engaged with the group of contacts 304b, and the battery 40b supplies power for the mobile phone 10b. The battery 40b can be detached and removed from the accommodating space 31b, and the battery 50b can then be rotated into the accommodating space 31a and become sole source of power for the mobile phone 10b. Therefore, the mobile phone remains powered on even while the battery is being replaced.

FIGS. 9-12 illustrate the electronic device with a back-up power supply during battery replacement in accordance with a third exemplary embodiment. The mobile phone 10c includes a body 20c, an electrode assembly 30c, and a PCB (not shown) mounted in the body 20c. An accommodating space 31c is defined in the body 20c and configured to accommodate a battery 40c. One corner of the accommodating space 31c has a hollow hole 21c defined therein. The electrode assembly 30c further includes a hollow column 310c, a rotation element 320c, an electric ring 303c, and a plurality of wires 330c. The rotation element 320c may rotate relative to the hollow column 310c. In this embodiment, the number of the wires 330c is four. All groups of contacts 304c are distributed along the central axis of the rotation element 320c. In this embodiment, the number of the groups of contacts 304c is four. The four wires 330c are connected to the electric ring 303c and arranged in a cross-shapes layout at the end portions away from the ring 303c. The hollow column 310c of the electrode assembly 30c is engaged with the hollow hole 21c and vertical with the surface of the accommodating space 31c. All groups of contacts 304c are connected in parallel to the electric ring 303c via the wires 330c and then to the PCB, thereby, all groups of contacts 304c provide the same voltage as the battery for the mobile phone 10c.

The battery 40c has a group of electric contacts on the surface. When the battery 40c is inserted into the accommodating space 31c, the group of electric contacts of the battery 40c is engaged with a group of contacts 304c, and thereby, the battery 40c supplies power for the mobile phone 10c. The battery 40c can be detached and removed from the accommodating space 31c, and the battery 50c can then be rotated into the accommodating space 31c and become sole source of power for the mobile phone 10c. Therefore, the mobile phone remains powered on even while the battery is being replaced.

It is understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. An electronic device comprising:
   a body defining an accommodating space;
   a printed circuit board (PCB) mounted in the body; and
   an electrode assembly connected to the PCB;
   wherein the electrode assembly may rotate relative to the body and further comprises at least two groups of contacts aligned in different rotation orientations, the accommodating space is configured to accommodate a first battery, a first group of the at least two groups of contacts is engaged with the first battery, the at least two groups of contacts are connected in parallel to the PCB, when the first battery is being replaced by a second battery, the first group of contacts is kept engaged with the first battery and a second group of the at least two groups of contacts is engaged with the second battery.

2. The electronic device as recited in claim 1, wherein the electrode assembly further comprises a rotation element and an electric ring connected to one end of the rotation element, all groups of contacts are positioned on the rotation element, and the electric ring is connected to all groups of contacts and then to the PCB.

3. The electronic device as recited in claim 2, wherein the rotation element is an axis and all groups of contacts are distributed on different surfaces of the axis.

4. The electronic device as recited in claim 3, wherein the electrode assembly further comprises a cavity member comprising the same number of surfaces with the axis, the cavity member accommodates the axis and all groups of the at least two groups of contacts, and the battery hooks one surface of the cavity member.

5. The electronic device as recited in claim 4, further comprising:
   two retaining protrusions extending from the body, for being engaged with the cavity member.

6. The electronic device as recited in claim 4, wherein each of at least two groups of surfaces of the cavity member defines an opening and the number of the openings is the same as the number of the at least two groups of contacts.

7. The electronic device as recited in claim 2, wherein the number of the groups of the at least two groups of contacts is four.

8. The electronic device as recited in claim 7, wherein the electrode assembly further comprises a hollow column and four wires, the four wires pass through the hollow column, are connected to the electric ring and arranged in a cross-shapes layout at the end portions away from the electric ring, one corner of the accommodating space is defined a hollow hole, the hollow column is engaged with the hollow hole, and the rotation element may rotate relative to the hollow column.

9. The electronic device as recited in claim 2, wherein the number of the groups of the at least two groups of contacts is three.

10. The electronic device as recited in claim 9, wherein the rotation element is a circular axis and a protruding part is formed between each group of the at least two groups of contacts and the axis.

11. The electronic device as recited in claim 10, wherein each battery has a hollow part, when the battery is inserted into the accommodating space, the hollow part is engaged with the protruding part and one group of the at least two groups of contacts of the electrode assembly is engaged with the battery.

* * * * *